United States Patent
Soares Silva et al.

(10) Patent No.: US 10,476,620 B2
(45) Date of Patent: Nov. 12, 2019

(54) SYSTEM AND METHOD OF DISTRIBUTED INTERFERENCE CANCELATION BASED ON DELAYED CHANNEL GAIN INFORMATION

(71) Applicants: INSTITUTO DE TELECOMUNICAÇÕES, Aveiro (PT); UNIVERSIDADE DE AVEIRO, Aveiro (PT)

(72) Inventors: Adão Paulo Soares Silva, Aveiro (PT); Atílio Manuel Da Silva Gameiro, Aveiro (PT); Daniel Filipe Marques Castanheira, Aveiro (PT)

(73) Assignees: INSTITUTO DE TELECOMUNICAÇÕES, Aveiro (PT); UNIVERSIDADE DE AVEIRO, Aveiro (PT)

( * ) Notice: Subject to any disclaimer, the term of this patent is extended or adjusted under 35 U.S.C. 154(b) by 0 days.

(21) Appl. No.: 16/315,810

(22) PCT Filed: Jul. 7, 2017

(86) PCT No.: PCT/IB2017/054124
§ 371 (c)(1),
(2) Date: Jan. 7, 2019

(87) PCT Pub. No.: WO2018/007998
PCT Pub. Date: Jan. 11, 2018

(65) Prior Publication Data
US 2019/0215088 A1    Jul. 11, 2019

(30) Foreign Application Priority Data
Jul. 7, 2016 (PT) .......................... 109516

(51) Int. Cl.
*H04J 11/00* (2006.01)

(52) U.S. Cl.
CPC .......... *H04J 11/003* (2013.01); *H04J 11/0036* (2013.01)

(58) Field of Classification Search
CPC .. H04B 7/0452; H04B 7/0054; H04B 7/0056; H04B 7/0615; H04J 11/003; H04J 11/0036; H04L 25/03057; H04L 2205/0349
See application file for complete search history.

(56) References Cited

U.S. PATENT DOCUMENTS

| 8,743,995 B2 | 6/2014 | Tse et al. |
| 2007/0110196 A1* | 5/2007 | McCloud .......... H04L 25/03057 375/348 |

(Continued)

OTHER PUBLICATIONS

Vahid Alirez, et al., "Communication through collisions: Opportunistic utilization of past receptions", IEEE INFOCOM 2014—IEEE Conference on Computer Communications, IEEE, (Apr. 27, 2014), pp. 2553-2561.

(Continued)

*Primary Examiner* — Thanh C Le
(74) *Attorney, Agent, or Firm* — Leason Ellis LLP

(57) ABSTRACT

The disclosure pertains to wireless communications and, more particularly, to the exploitation of channel gain information, advantageously where more than two transmitter/receiver pairs transmit information over a shared medium. The disclosure applies distributed interference compression (23) at the receivers (receiver 1 (8), . . . , receiver k (9), . . . , and receiver K (10)) and repetition coding (13) at the transmitters (transmitter 1 (1), . . . , transmitter k (2), . . . , transmitter K (3)). Repetition coding repeats the same symbol stream (11) several times and the distributed interference compression (23) reduces the number of interference retransmissions (15) required to obtain the interference free signal (26). The throughput achieved by previous (Continued)

solutions is limited to two symbols per time slot, whereas in the present disclosure throughput is enhanced and is proportional to the square root of the number of transmitter/receiver pairs considered.

16 Claims, 4 Drawing Sheets

(56) References Cited

U.S. PATENT DOCUMENTS

| | | | | |
|---|---|---|---|---|
| 2012/0287968 | A1* | 11/2012 | Gainey | H04B 7/15585 |
| | | | | 375/211 |
| 2013/0286903 | A1* | 10/2013 | Khojastepour | H04B 1/525 |
| | | | | 370/280 |
| 2016/0344432 | A1* | 11/2016 | Hwang | H04B 1/525 |
| 2017/0054482 | A1* | 2/2017 | Forenza | H04B 7/0456 |

OTHER PUBLICATIONS

Grieger M, et al., "On the Performance of Compressed Interference Forwarding for Uplink Base Station Cooperation", Global Telecommunications Conference, 2009. Globecom 2009. IEEE, IEEE, Piscataway, NJ, USA, (Nov. 30, 2009), pp. 1-6.

M. A. Maddah-Ali, et al., "Completely Stale Transmitter Channel State Information is Still Very Useful", IEEE Trans. Inform. Theory, (20120700), vol. 58, No. 7, pp. 4418-4431.

M. J. Abdoli, et al., "On the Degrees of Freedom of K-User SISO Interference and X Channels With Delayed CSIT", IEEE Trans. Inform. Theory, (20131000), vol. 59, No. 10, pp. 6542-6561.

* cited by examiner

SYSTEM AND METHOD OF DISTRIBUTED INTERFERENCE CANCELATION BASED ON DELAYED CHANNEL GAIN INFORMATION

CROSS REFERENCE TO RELATED APPLICATIONS

This application is a U.S. National Stage Application under 35 U.S.C. § 371 of International Patent Application No. PCT/IB2017/054124, filed Jun. 7, 2017, which claims priority to Portugal Application No. 109516, filed Jun. 7, 2016, which are hereby incorporated by reference in their respective entireties.

TECHNICAL FIELD

The present disclosure relates to wireless communications, more particularly to the exploitation of channel gain information for distributed interference cancellation, advantageously where more than two transmitter-receiver pairs transmit information over a shared medium.

BACKGROUND

Interference is the main limitation faced by today wireless technologies, mainly due to the network densification, user density and the exponential increase in wireless data traffic verified in over the last few years. The dynamic nature of wireless communications further exacerbates the interference problem as the transmission and reception entities are unable to adapt as fast as the radio environment dynamics. Namely, when the transmission and reception entities adapt the network state may be already different and then the adaptation instead of being beneficial is detrimental.

Channel gain information is a crucial component for enhancing the throughput of current and future wireless systems, by enabling the adaptation of the transmission and reception entities to the network state. Channel gain information, when available, may be utilized to improve the system multiplexing gain, i.e. to simultaneously send data to multiple receivers.

The channel is usually estimated at the receivers and then fed back to the transmitter or transmitters. This procedure leads to a delay in the availability of channel gain information at the transmitter or transmitters. If the delay is larger than the channel coherence time, due to high mobility for example, the current channel realization cannot be predicted by the received channel gain information. Therefore, the use of predicted channel gain information based on outdated information leads to no multiplexing gain. However, when only one transmitter is considered, this transmitter is the only source of interference and then the delayed channel gain information may be used to reconstruct the previously generated interference (at one or more receivers) and format future transmit signals to be useful to more than one receiver (see M. A. Maddah-Ali and D. Tse, "Completely Stale Transmitter Channel State Information is Still Very Useful," IEEE Trans. Inform. Theory, vol. 58, no. 7, pp. 4418-4431, July 2012). In contrast, when at least two transmitters simultaneously transmit there are two sources of interference and since that each transmitter only has access to its transmitted symbol stream, each transmitter is unable to reconstruct the whole past interference.

For the single transmitter case, the delayed channel gain information is used to determine combinations of the transmitted symbols that were received by the various receiving nodes in previous transmissions (under those channel gains). Based on this knowledge, the transmitter decides how to recombine the symbols intended for different users in the current transmission to aid the receivers to decode the data they needed (see U.S. Pat. No. 8,748,995 B2).

However, when more than one transmitter is present many state of the art approaches try to convert the case with more than one transmitter to the single transmitter case, by transmitting some redundancy together with the symbol stream. By doing this the receivers remove part of the interference and leave behind several linear combinations where only one transmitter is the interferer (see M. J. Abdoli, A. Ghasemi, and A. K. Khandani, "On the Degrees of Freedom of K-User SISO Interference and X Channels With Delayed CSIT," IEEE Trans. Inform. Theory, vol. 59, no. 10, pp. 6542-6561, October 2013). Contrarily to the case where more than one transmitter causes interference, the corresponding interferer can reconstruct the remaining interference terms and retransmit them.

For all previously proposed methods, as the number of transmitter/receiver pairs increases the number of interference retransmissions required increases proportionally. As a consequence, the throughput achieved by all previously proposed methods does not scale with the number of transmitter/receiver pairs. To illustrate, when a large number of transmitter/receiver pairs are considered the throughput is at most equal to two symbols per time slot.

These facts are disclosed in order to illustrate the technical problem addressed by the present disclosure.

SUMMARY OF THE DISCLOSURE

One of the objectives of the present disclosure is to enhance the overall throughput of the communication systems by utilizing delayed channel gain information for distributed interference compression and removal.

The disclosure targets a dynamic environment where the transmitters, the receivers or even the scattering environment are not static.

The present disclosure is useful for a communication scenario with several distributed transmitters and receivers sharing a common medium. In this dynamic and distributed communication scenario interference removal is of special importance to enhance the system throughput and to enable the simultaneous transmission of information from several transmitters to several receivers, using the same resources.

Advances in information theory have shown that the aggregate capacity of multiple transmitter-receiver wireless system can grow with the number of users. The present disclosure allows using only delayed channel information and non-cooperative transmitters/receivers to aggregate capacity to grow up with a factor of the square root of the number of users.

The throughput achieved by the present disclosure is not limited by two symbols per time slot and scales proportionally to the square root of the number of transmitter/receiver pairs considered. Namely, the present disclosure achieves enhanced symbol rate by applying repetition coding (13) to the symbol stream (11) at each transmitter (transmitter 1 (1), . . . , transmitter k (2), . . . , transmitter K (3)) and distributed interference compression (23) at each receiver (receiver 1 (8), . . . , receiver k (9), . . . , and receiver K (10)). Repetition coding (13) repeats the symbol stream (11) several times and distributed interference compression (23) make the interference generated by transmitter k (2) identical at all receivers (receiver 1 (8), . . . , receiver k (9), . . . , and receiver K (10)). After distributed interference compression (23) the transmitters (transmitter 1 (1), ..., transmitter k (2), ..., transmitter K (3)) use the delayed channel gain information (12) to determine the compressed interference signal (18) and broadcast the determined compressed interference signal (18) to all receivers (receiver 1 (8), ..., receiver k (9), ..., and receiver K (10)). The receiver k (9) uses the received compressed interference signals (22a), ..., (22c) to obtain the aggregate received compressed interference (27) to be subtracted (25) from the received compressed signal block 0 (24) and obtain the interference free signal (26).

Previously available solutions use redundant transmissions so that the receivers (receiver 1 (8), ..., receiver k (9), ..., and receiver K (10)) can null part of the interferes and end up with just the desired symbol stream (11) and only one interferer. In the present disclosure the receivers (receiver 1 (8), ..., receiver k (9), ..., and receiver K (10)) do not null any of the interferes, instead the interference generated by each transmitter (transmitter 1 (1), ..., transmitter k (2), ..., transmitter K (3)) passes through a distributed interference compression block (23) to reduce the number of interference retransmissions (15), required to obtain the interference free signal (26).

However, the present disclosure also uses redundancy, since the same symbol stream, is repeated several times using repetition coding (13), but the purpose of the redundant transmission is different. In the proposed solution repetition coding (13) is used to get the desired signal through independent channels, with the aim of generating new combinations of the desired data at the receiver and enable a higher interference compression ratio and further reduce the number of interference retransmissions (15), required to obtain the interference free signal (26).

Features of the present disclosure that distinguish it from previous solutions are the distributed interference compression (23) performed at the receivers (receiver 1 (8), ..., receiver k (9), ..., and receiver K (10)) and the repetition coding (13) performed at the transmitters (transmitter 1 (1), ..., transmitter k (2), ..., transmitter K (3)).

One of the main advantages of the present disclosure is the achieved throughput, which scales with the number of transmitter/receiver pairs. The throughput achieved by the present disclosure is proportional to the square root of the number of transmitter/receiver pairs. For example, for a network with 100 transmitter/receiver pairs the throughput is around 5 times higher than the one obtained by a single transmitter/receiver pair. With the previous solutions the throughput is only around 2 times higher than the one obtained by a single transmitter/receiver pair and even if more transmitter/receiver pairs are considered the gain is limited to 2. On the contrary, for the present disclosure, the gain in throughput increases when more transmitter/receiver pairs are present.

Thus, advantages of the disclosure include:
throughput is enhanced and proportional to the square root of the number of transmitter/receiver pairs;
interference is cancelled using only outdated channel gain information;
the interference removal procedure is distributed.

The disclosure has application in scenarios where several transmitter and receiver pairs communicate simultaneously, in particular vehicular communications, machine to machine communications and stadium wireless communications, including coffee shops, public spaces such as supermarkets, airports, hospitals and business workspaces.

An embodiment is characterized by the exploitation of channel gain information beyond mere prediction, by utilizing delayed channel gain information for distributed interference compression and removal.

An embodiment is characterized by distributed interference compression (23) which reduces the number of interference retransmissions (15) required to obtain the interference free signal (26).

An embodiment is characterized by the interference generated by transmitter k (2) which is given by a subset of the entries of vector $a_k$ after applying the distributed interference compression (23) block.

An embodiment is characterized by vector $a_k$ which only depends on the transmitter k symbol stream (11) and is independent of the symbol stream (11) of the other K−1 transmitters.

An embodiment is characterized by transmitter k (2) which only needs to transmit the compressed interference signal (18) and it suffices to cancel the interference generated by transmitter k (2) at all receivers (receiver 1 (8), ..., receiver k (9), ..., receiver K (10)) and not just one of the receivers.

An embodiment is characterized by repetition coding (13) which is used to get the desired signal through independent channels, with the aim of generating new combinations of the desired data at the receiver and enable a higher interference compression ratio and further reduce the number of interference retransmissions (15), required to obtain the interference free signal.

An embodiment is characterized by a distributed interference compression (23) block at receiver 1 (8), ..., receiver k (9), ..., and receiver K (10) and a repetition coding (13) block at transmitter 1 (1), ..., transmitter k (2), ..., and transmitter K (3).

An embodiment is characterized by an interference compression and retransmission (15) block at transmitter 1 (1), ..., transmitter k (2), ..., and transmitter K (3) and a block to aggregate received compressed interference (27) and a subtraction block (25) at receiver 1 (8), ..., receiver k (9), ..., and receiver K (10).

An embodiment is characterized by enhanced symbol throughput of said transmitter/receiver pairs (transmitter 1 (1)/receiver 1 (8), ..., transmitter k (2)/receiver k (9), ..., and transmitter K (3)/receiver K (10)).

An embodiment is characterized by parameter R which when set to R=$[\sqrt{K}]$−1 the proposed invention embodiment achieves the highest throughput, which is proportional to the square root of the number of transmitter/receiver pairs considered.

An embodiment is characterized in that the repetition coding (13) component is composed of one input, the symbol stream (11), and one output, the encoded symbol stream (16).

An embodiment is characterized in that the distributed interference compression (23) component is composed of two inputs, the delayed channel gain information (19) and the received signal block 0 (20) and one output, the received compressed signal block 0 (24).

An embodiment is characterized in that the interference compression and retransmission (15) component is composed of two inputs, the delayed channel gain information (12) and the symbol stream (11), and one output, the compressed interference signal, transmitted at block k (18).

An embodiment is characterized in that the sum (21) component is composed of K−1 inputs, the received compressed interference signal block 1 (22a), ..., and the received compressed interference signal block K (22c), and one output, the aggregate received compressed interference (27).

An embodiment is characterized in that the subtraction (25) component is composed of two inputs, the received compressed signal block 0 (24) and the aggregate received compressed interference (27), and one output, the interference free signal (26).

An embodiment is characterized by distributed interference compression (23) and subtraction (25), repetition coding (13) and interference compression and retransmission (15), wherein the method is implemented in the form of an integrated circuit.

An embodiment is characterized by distributed interference compression (23) and subtraction (25), repetition coding (13) and interference compression and retransmission (15), wherein the method is implemented in the form of an executable program in at least one computer processor.

It is disclosed a transmitter device for a system of distributed interference cancellation based on delayed channel gain information for a plurality of transmitters and respective receivers, wherein the transmitter device is configured to:
- apply repetition coding to a symbol stream to be transmitted to obtain an encoded symbol stream;
- apply a distributed interference compression to said symbol stream and to delayed channel gain information, to obtain a compressed interference signal;
- transmit a signal of said encoded symbol stream and said compressed interference signal;
- wherein said distributed interference compression is calculated such that the interference generated by each transmitter is the same, at the receivers, after distributed interference compression by each receiver.

In an embodiment, the transmitter device is further configured to apply the distributed interference compression to said symbol stream and to delayed channel gain information, to obtain a compressed interference signal, by applying the following operator:

$$X = \left[ \prod_{p,m,i \in S} \left( H_{mi}^{p(n_{mi}^p)} \right)^H w \right]^H_{\{0 \leq n_{mi}^p \leq n\}_{p,m,i \in S}} \quad (1)$$

where w may be any column vector, where $H_{kj}^r = \text{diag}(h_{kj}((r-1)T+1), \ldots, h_{kj}((r-1)T+T))$ is the rth T symbol extension of the channel, $h_{kj}(t)$ represents the channel between transmitter j and receiver k at time t, K is the number of transmitter-receivers of said system, R is the number of groups of $T = Rn^N + (n+1)^N$ time slots, where n is chosen from the positive integer numbers, N=RK (K-1), and S={(r, k, j)|r∈{1, ... R},k≠j∈{1, ..., K}}.

It is also disclosed a receiver device for a system of distributed interference cancellation based on delayed channel gain information for a plurality of transmitters and respective receivers, wherein the receiver device is configured to:
- receive an encoded symbol stream signal transmitted by an transmitter device, wherein repetition coding was applied by each transmitter to a symbol stream to be transmitted to obtain an encoded symbol stream;
- receive compressed interference signals of said system transmitters, wherein distributed interference compression was applied by each transmitter to said symbol stream and to delayed channel gain information, to obtain a compressed interference signal;
- sum the received compressed interference signals of said system transmitters, except the received compressed interference signal from said transmitter device, to obtain an aggregate compressed interference signal;
- apply a distributed interference compression to the received symbol stream signal and to channel gain information, to obtain a received compressed signal;
- subtract from the received compressed signal the aggregate compressed interference signal, to obtain an interference-free signal;
- wherein said distributed interference compression is calculated such that the interference generated by each transmitter is the same, at the receivers, after distributed interference compression by each receiver.

In an embodiment, the receiver device is further configured to apply the distributed interference compression to the received symbol stream signal and to channel gain information, to obtain the received compressed signal, by applying the following linear transformation:

$$W = \left[ \prod_{p,m,i \in S} \left( H_{mi}^{p(n_{mi}^p)} \right)^H w \right]_{\{0 \leq n_{mi}^p \leq n-1\}_{p,m,i \in S}} \quad (2)$$

where w may be any column vector, where $H_{kj}^r = \text{diag}(h_{kj}((r-1)T+1), \ldots, h_{kj}((r-1)T+T))$ is the rth T symbol extension of the channel, $h_{kj}(t)$ represents the channel between transmitter j and receiver k at time t, K is the number of transmitter-receivers of said system, R is the number of groups of $T = Rn^N + (n+1)^N$ time slots, where n is chosen from the positive integer numbers, N=RK (K-1), and S={(r, k, j)|r∈{1, ... R}, k≠j∈{1, ..., K}}.

In an embodiment, the receiver device is further configured to:
- recover the transmitted symbol stream from the interference-free signal and from the received compressed interference signal from said transmitter device.

It is disclosed a system of distributed interference cancellation based on delayed channel gain information for a plurality of transmitters and respective receivers, comprising a plurality of transmitters according to the disclosed embodiments, and a plurality of receivers according to the disclosed embodiments.

It is also disclosed a method of operating a transmitter device for a system of distributed interference cancellation based on delayed channel gain information for a plurality of transmitters and respective receivers, wherein the method comprises:
- applying repetition coding to a symbol stream to be transmitted to obtain an encoded symbol stream;
- applying a distributed interference compression to said symbol stream and to delayed channel gain information, to obtain a compressed interference signal;
- transmitting a signal of said encoded symbol stream and said compressed interference signal;
- wherein said distributed interference compression is calculated such that the interference generated by each transmitter is the same, at the receivers, after distributed interference compression by each receiver.

In an embodiment, the applying of the distributed interference compression to said symbol stream and to delayed channel gain information, to obtain a compressed interference signal, is by applying the following operator:

$$X = \left[ \prod_{p,m,i \in S} \left( H_{mi}^{p(n_{mi}^p)} \right)^H w \right]^H_{\{0 \leq n_{mi}^p \leq n\}_{p,m,i \in S}} \quad (3)$$

where w may be any column vector, where $H_{kj}^r=\text{diag}(h_{kj}((r-1)T+1), \ldots, h_{kj}((r-1)T+T))$ is the rth T symbol extension of the channel, $h_{kj}(t)$ represents the channel between transmitter j and receiver k at time t, K is the number of transmitter-receivers of said system, R is the number of groups of $T=Rn^N+(n+1)^N$ time slots, where n is chosen from the positive integer numbers, N=RK (K−1), and S={(r, k, j)|r∈{1, ... R}, k≠j∈{1, ..., K}}.

It is also disclosed a method to operate a receiver device for a system of distributed interference cancellation based on delayed channel gain information for a plurality of transmitters and respective receivers, wherein the method comprises:

receiving an encoded symbol stream signal transmitted by an transmitter device, wherein repetition coding was applied by each transmitter to a symbol stream to be transmitted to obtain an encoded symbol stream;

receiving compressed interference signals of said system transmitters, wherein distributed interference compression was applied by each transmitter to said symbol stream and to delayed channel gain information, to obtain a compressed interference signal;

summing the received compressed interference signals of said system transmitters, except the received compressed interference signal from said transmitter device, to obtain an aggregate compressed interference signal;

applying a distributed interference compression to the received symbol stream signal and to channel gain information, to obtain a received compressed signal;

subtracting from the received compressed signal the aggregate compressed interference signal, to obtain an interference-free signal;

wherein said distributed interference compression is calculated such that the interference generated by each transmitter is the same, at the receivers, after distributed interference compression by each receiver.

In an embodiment, the applying of the distributed interference compression to the received symbol stream signal and to channel gain information, to obtain the received compressed signal, is by applying the following linear transformation:

$$W = \left[ \prod_{p,m,i \in S} \left(H_{mi}^{p(n_{mi}^p)}\right)^H w \right]_{\{0 \leq n_{mi}^p \leq n-1\}_{p,m,i \in S}} \quad (4)$$

where w may be any column vector, where $H_{kj}^r=\text{diag}(h_{kj}((r-1)T+1), \ldots, h_{kj}((r-1)T+T))$ is the rth T symbol extension of the channel, $h_{kj}(t)$ represents the channel between transmitter j and receiver k at time t, K is the number of transmitter-receivers of said system, R is the number of groups of $r=Rn^N+(n+1)^N$ time slots, where n is chosen from the positive integer numbers, N=RK (K−1), and S={(r, k, j)|r∈{1, ... R}, k≠j∈{1, ..., K}}.

It is also disclosed a non-transitory storage media including program instructions for implementing a method, the program instructions including instructions executable to carry out any of the disclosed methods.

BRIEF DESCRIPTION OF THE DRAWINGS

The following figures provide preferred embodiments for illustrating the description and should not be seen as limiting the scope of invention.

DETAILED DESCRIPTION OF CERTAIN EMBODIMENTS

Figure 1:
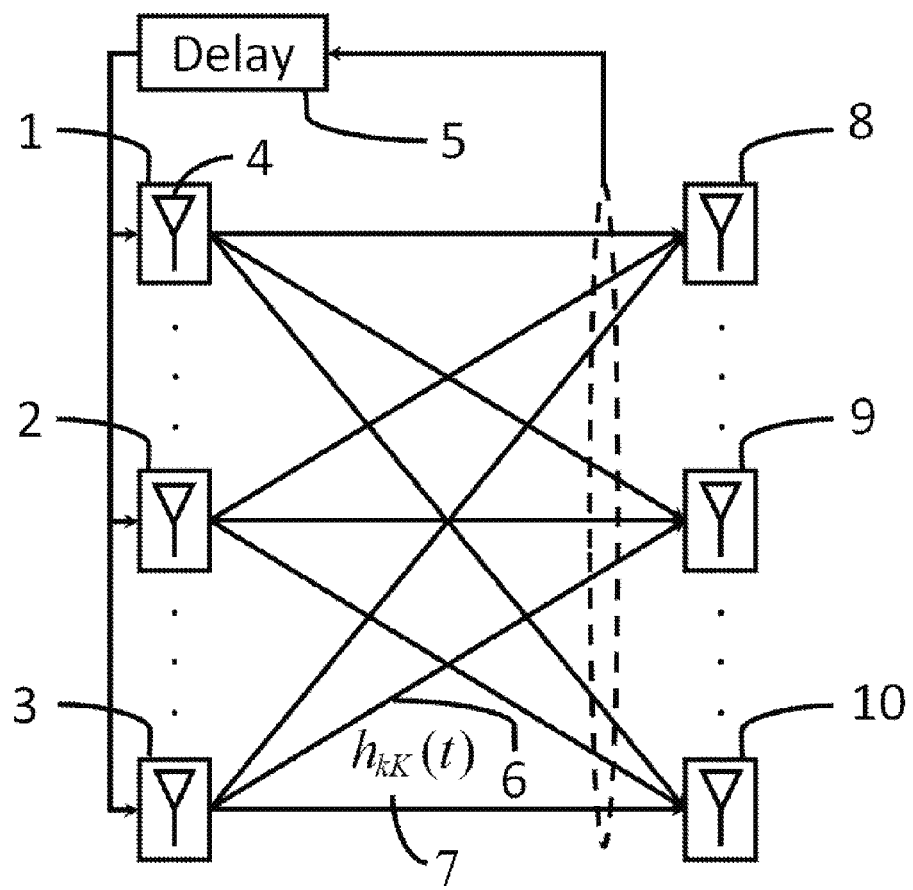
FIG. 1 is a schematic of K transmitters (transmitter 1 (1), ..., transmitter k (2), ..., transmitter K (3)) each with a transmit antenna (4), communicating wirelessly with K receivers (receiver 1 (8), ..., receiver k (9), ..., receiver K (10)), each with a receive antenna, with a delay in the determination of the channel gain information (5). The channel between transmitter K and receiver k at time slot t (6) is represented by $h_{Kk}(t)$ (7).
Figure 2:
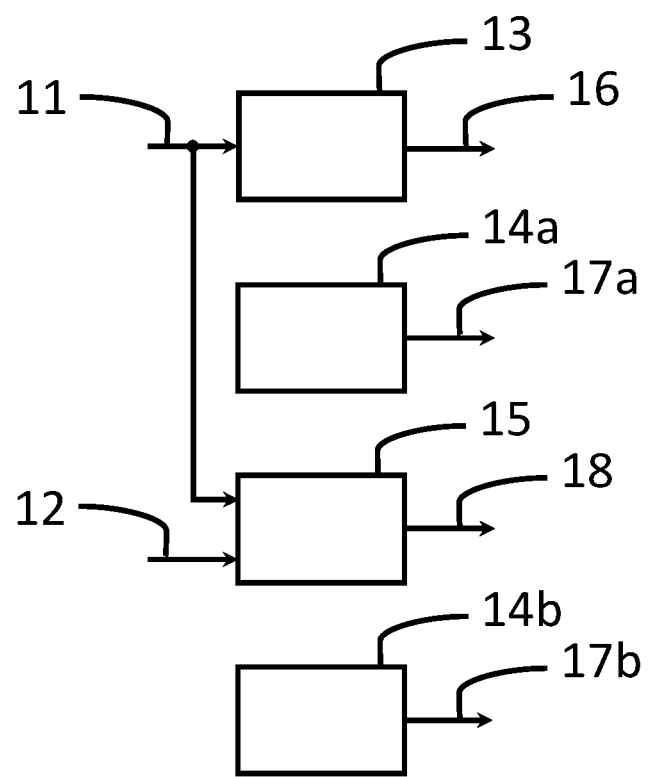
FIG. 2 is a block diagram of transmitter k, whose inputs are a symbol stream (11) and the delayed channel gain information (12). The symbol stream (11) passes through the repetition coding block (13) and through the interference compression and retransmission block (15), whose outputs are an encoded symbol stream (16) and a compressed interference signal, transmitted at block k (18), respectively. The interference compression and retransmission block (15) has two inputs, the symbol stream (11) and the delayed channel gain information (12), which are used to determine the compressed interference signal, transmitted at block k (18). When transmitter k is not active it is in an idle state (14a), (14b), and no transmission (17a), (17b) takes place.
Figure 3:
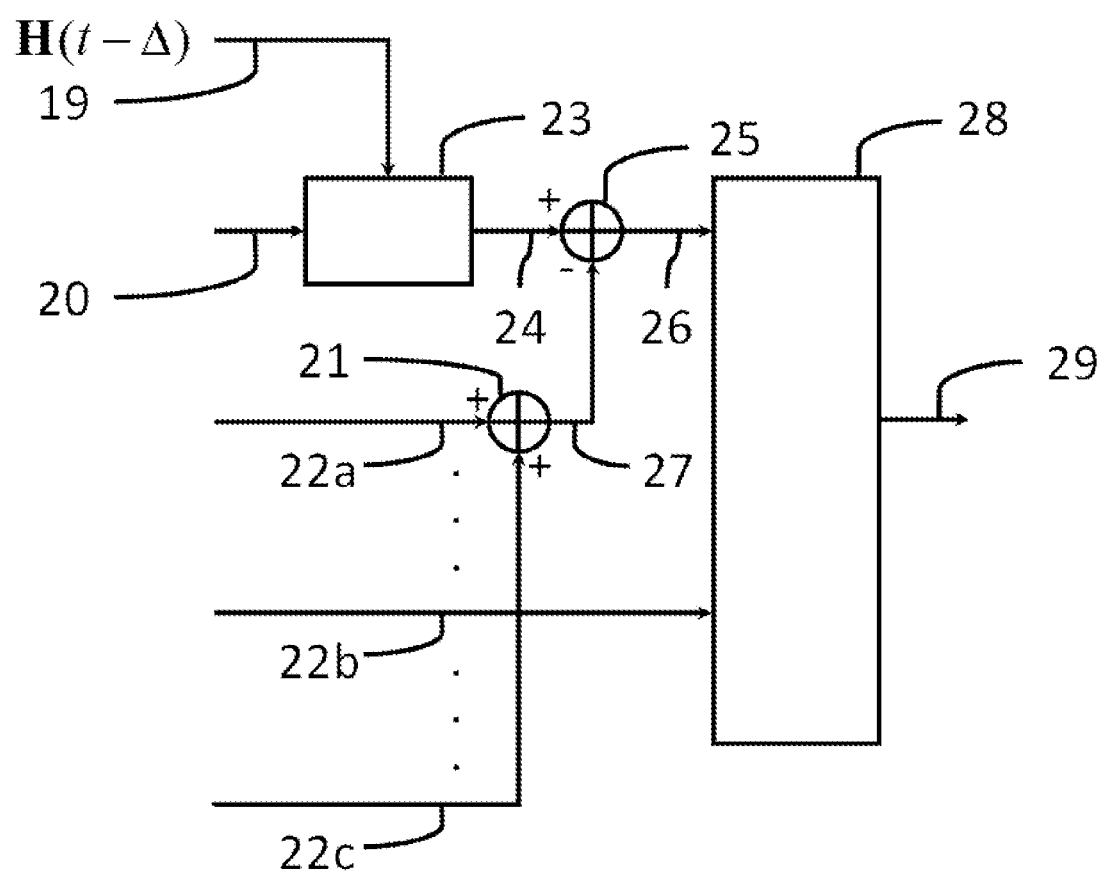
FIG. 3 is a block diagram of receiver k, whose inputs are the delayed channel gain information (19), the received signal block 0 (20), the received compressed interference signal block 1 (22a), ..., the received compressed interference signal block k (22b), ..., and the received compressed interference signal block K (22c). The aggregate received compressed interference (27) is the sum (21) of the received compressed interference signal block 1 (22a), ..., the received compressed interference signal block k (22b), ..., and the received compressed interference signal block K (22c). The delayed channel gain information (19) and the received signal block 0 (20) pass through the distributed interference compression block (23) to generate the received compressed signal block 0 (24). The interference free signal (26) is obtained by subtraction (25) of the aggregate received compressed interference (27), from the received compressed signal block 0 (24). The recovered data (29) is the output of the data stream separation block (28).
Figure 4:
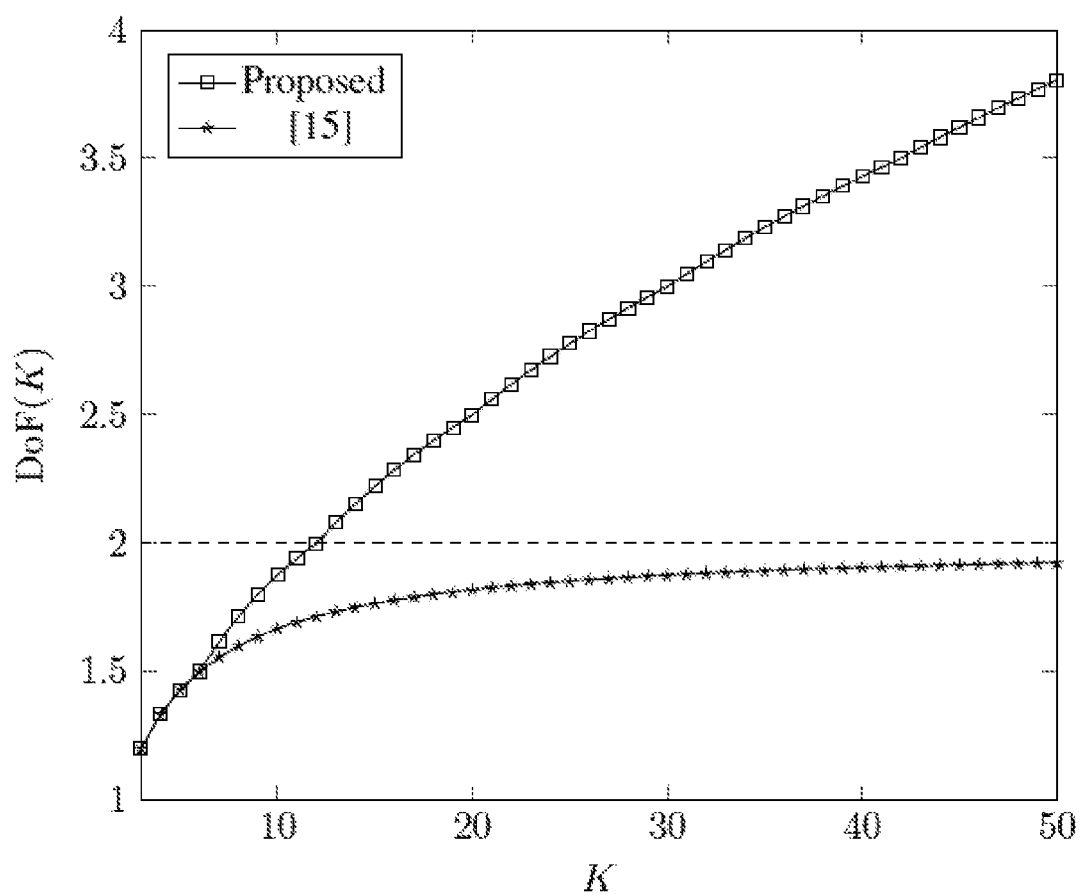
FIG. 4 is a schematic representation of achievable DoF for the K-user SISO IC with delayed CSIT, comparing the proposed disclosure with a prior art approach.

FIG. 1 illustrates an example of a downlink embodiment in a wireless communication system of K transmitter/receiver pairs each with single antenna. As illustrated the communication system includes K transmitter/receiver pairs (transmitter 1 (1)/receiver 1 (8), ..., transmitter k (2)/receiver k (9), ..., and transmitter K (3)/receiver K (10)). In FIG. 1, both the transmitters and receivers are equipped with a single transmit antenna (4). There is a channel between each transmitter and each receiver (6). These channels may vary with respect to time due to movement of either the transmitters or the receivers and also due to movement in the scattering environment. The complex number $h_{kj}(t)$ represents the channel between transmitter j and receiver k at time t (7) and is the so-called "baseband representation" of the channel. The received signal at receiver k, denoted by $y_k(t) \in \square$, is the sum of the signals transmitted by transmitter 1 (1), ..., transmitter k (2), ..., and transmitter K (3), denoted by $x_1(t) \in \square, \ldots, x_k(t) \in \square, \ldots,$ and $x_K(t) \in \square$ respectively, multiplied by the corresponding channel gains (6). Mathematically, the receiver signal at receiver k (9) and time slot t is $$y_k(t) = \sum_{j=1}^{K} h_{kj}(t)x_j(t) \quad (5)$$

Here time t is slotted meaning that time is measured in terms of the number of symbols transmitted and thus time is indicated using positive integer values. Estimates of the channel gains are assumed, in the present disclosure, to be obtained at the transmitters and receivers after a certain delay. Since the channels are time-varying the delay in determining channel gain information (5) may be sufficient to make the delayed channel measurements and the current channel gains significantly differ. In this example, it is assumed for simplicity a unitary delay in determining the channel gain information (5). A generalization for any non-unitary delay is straightforward.

To make the description clearer we divide the description of the present disclosure in two phases. The first phase is denominated by "data transmission" and the second by interference retransmission phase. The names given to the two phases reflect the operations done on each one. In the data transmission phase the transmitters send a symbol stream (11) to the receivers. In the interference retransmission phase the transmitters compress and retransmit (15) the interference generated in the first phase so that the receivers may subtract (25) the received compressed interference (22a), (22b), (22c) from the received compressed signal (24) and obtain an interference free signal (26).

The first phase spans R∈□ groups of T=Rn$^N$+(n+1)$^N$ time slots where n∈□ and N=RK(K−1). Accordingly to equation (5), the received signal of the user k at group r∈{1, . . . , R} is $$y_k^r = \sum_{j=1}^{K} H_{kj}^r x_j^r \quad (6)$$

where $H_{kj}^r$=diag($h_{kj}$((r−1)T+1), . . . , $h_{kj}$((r−1)T+T)) is the rth T symbol extension of the channel, where column vector $x_j^r$=[$x_j$((r−1)T+1)*, . . . , $x_j$((r−1)T+T)*]$^H$ is a T×1 represents the T symbol extension of the transmitted symbols and $y_k^r$ represent the T symbol extension of the received signal.

The received signal block 0 (20) corresponds to the signal [($y_k^1$)$^H$, . . . , ($y_k^R$)$^H$]$^H$ and the encoded symbol stream (16) to the signal [($x_k^1$)$^H$, . . . , ($x_k^R$)$^H$]$^H$.

The repetition coding block (13) repeats the symbol stream (11) R times to form the encoded symbol stream (16). Let $s_k$=[$s_{ki}$]$_{1 \le i \le T}$∈□$^T$ be the symbol stream (11) of transmitter k (2) then the encoded symbol stream (16) is given by [($x_k^1$)$^H$, . . . , ($x_k^R$)$^H$]$^H$=[($s_k$)$^H$, . . . ($s_k$)$^H$]$^H$.

The distributed interference compression block (23) compresses the received signal block 0 (20) utilizing the delayed channel gain information (19) to obtain the received compressed signal block 0 (24) by applying the following linear transformation $$W = \left[ \prod_{p,m,i \in S} \left( H_{mi}^{p(n_{mi}^p)} \right)^H w \right]_{\{0 \le n_{mi}^p \le n-1\}_{p,m,i \in S}} \quad (7)$$

where w may be any column vector (e.g. the all ones column vector) and S={(r, k, j)|r∈{1, . . . R}, k≠j∈{1, . . . K}}.

The second phase spans KI=K(n+1)$^N$ time slots. In this phase, each transmitter retransmits the interference generated in the first phase and for that uses I time slots. Let X∈□$^{T \times I}$ be a matrix with dimensionality I=(n+1)$^N$ and given by $$X = \left[ \prod_{p,m,i \in S} \left( H_{mi}^{p(n_{mi}^p)} \right)^H w \right]_{\{0 \le n_{mi}^p \le n\}_{p,m,i \in S}} \quad (8)$$

then transmitter k (2) retransmits each entry of the I=(n+1)$^N$ dimensional vector $a_k$=X$s_k$, in a separate time slot. Firstly, transmitter 1 (1) sends $a_1$, then transmitter 2 sends $a_2$ and it continues this way until transmitter K (3) sends $a_K$. To be more precise we have Transmitter 1 ((n+1)$^N$ time slots): $x_1$=$a_1$=X$s_1$ Transmitter 2 ((n+1)$^N$ time slots): $x_2$=$a_2$=X$s_2$ Transmitter K ((n+1)$^N$ time slots): $x_K$=$a_K$=X$s_K$ (9)

where $x_k$=[$x_k$(RT+(k−1)I+1)*, . . . , $x_k$(RT+kI)*]$^H$ is a I×1 column vector that represents the compressed interference signal, transmitted at block k (18) by transmitter k (2). In the second phase, the K transmitters transmit in different time slots. The transmitters have the required channel gain information to compute matrix x in the second phase since x is only a function of the delayed channel gain information (12). Furthermore, vector $a_k$ only depends on the transmitter k symbol stream (11) and is independent of the symbol stream (11) of the other K−1 transmitters. Matrix X∈□$^{T \times I}$ completely defines the operation done at the interference compression and retransmission block (15) at transmitter k (2), whose output is given by $$x_k = X s_k \quad (10)$$

As previously mentioned, in the remaining time slots of the second phase, transmitter k (2) is in idle state, represented by the idle state block (14a), (14b), and no transmission (17a), (17b) is performed.

After transmitter 1 (1), . . . , transmitter k (2), . . . , and transmitter K (3) perform the interference compression and retransmission (15) operation, receiver 1 (8), . . . , receiver k (9), . . . , and receiver K (10), obtain the received compressed interference signal block 1 (22a), . . . , the received compressed interference signal block k (22b), . . . , and the received compressed interference signal block K (22c).

The receiver k (9) sums (21) the received compressed interference signal block 1 (22a), . . . , and the received compressed interference signal block K (22c) to obtain the aggregated interference compressed signal (27).

The aggregated interference compressed signal (27) is subtracted (25) from the received compressed signal block 0 (24) to obtain the interference free signal (26).

To obtain the recovered data (29) transmitter k (2) combines the interference free signal (26) with the compressed interference signal block k (22b), which for transmitter k (2) contains combinations of the symbol stream (11) of transmitter k (2). To perform the data stream separation (29) receiver k (9) may use, for example, zero-forcing but any other similar operation, may be considered.

The previous paragraphs contain a description of how the present disclosure works, but do not explain why it works. In the following paragraphs we give more details about this aspect of the present disclosure. Namely, we explain why transmitter k (2) only needs to transmit the compressed interference signal (18), $x_k=Xs_k$, and it suffices to cancel the interference generated by transmitter k (2) at all receivers (receiver 1 (8), . . . , receiver k (9), . . . , receiver K (10)) and not just at one of the receivers. Furthermore, we explain why the interference free signal (26) and the received compressed interference block k (22b) are sufficient to recover the transmitter k (2) symbol stream (11).

The interference generated by transmitter k (2) at receiver 1 (8), . . . , and receiver K (10) is given by $[H_{1k}^1 s_k, \ldots, H_{1k}^R s_k]$, . . . , and $[H_{Kk}^1 s_k, \ldots H_{Kk}^R s_k]$, respectively. After the distributed interference compression block (23) the interference signal is given by $[W^H H_{1k}^1 s_k, \ldots, W^H H_{1k}^R s_k]$, . . . , and $[W^H K_{Kk}^1 s_k, \ldots, W^H H_{Kk}^R s_k]$. Accordingly to the definition of matrix w, see equation (7), we have for all $j \in \{1, \ldots, k-1, k+1, K\}$ and all $r \in \{1, \ldots, R\}$ that $$W^H H_{jk}^r s_k \prec X s_k \quad (11)$$

where $A \prec B$ means that the set of row vectors of matrix A is a subset of matrix B. According to (11), matrix X completely defines the interference generated in the first phase since the interference generated by transmitter k (2) is given by a subset of the entries of vector $a_k = X s_k \in \square^I$ after applying the distribution interference compression (23) block. Indeed, for receiver 1 (8), . . . , and receiver K (10) we have $[W^H H_{1k}^1 s_k, \ldots, W^H H_{1k}^R s_k] \prec [Xs_k, \ldots, Xs_k] \prec Xs_k$, . . . , and $[W^H H_{Kk}^1 s_k, \ldots, W^H H_{Kk}^R s_k] \prec [Xs_k, \ldots, Xs_k] \prec Xs_k$. Therefore, the compressed interference signal (18) is sufficient to obtain the interference free signal (26) at all receivers.

Let $z_k^r = W^H y_k^r \in \square^d$ and $G_{kj}^r = W^H H_{kj}^r$, then the received signal block 0 (20) at receiver k (9) and after the distributed interference compression block (23) is $$z_k^r = G_{kk}^r s_k + \sum_{j=1, j\neq k}^{K} G_{kj}^r s_j \quad (12)$$

$$= G_{kk}^r s_k + \sum_{j=1, j\neq k}^{K} P_{kj}^r a_j$$

where equation (12) follows from equation (11) and $P_{kj}^r \in \square^{n^N \times (n+1)^N}$ with $j \neq k \in \{1, \ldots, K\}$ are permutation matrices with $I - d = (n+1)^N - n^N$ rows removed. Please note that the compressed interference signal (18) of transmitter k (2), i.e. vector $a_k$, does not depend on the parameter $r \in \{1, \ldots, R\}$. Furthermore, if all receivers have the knowledge of the compressed interference signal, transmitted at block k (18), $r \in \{1, \ldots, R\}$, then the interference may be completely removed accordingly to equation (12).

The retransmission of the compressed interference signals (18), vectors $a_1, \ldots, a_K$, is sufficient to cancel the interference generated in the first phase accordingly to matrix $P_{kj}^r$ definition and equation (12). The interference is removed by subtracting (25) the aggregated received compressed interference (27) $\sum_{j=1, j\neq k}^{K} P_{kj}^r a_j$ from the received compressed signal block 0 (24)

$$W_k^{rH} H_{kk}^r s_k = G_{kk}^r s_k = z_k^r - \sum_{j=1, j\neq k}^{K} P_{kj}^r a_j, \quad (13)$$

This interference cancellation procedure leaves us with $d = n^N$ linear combinations of the desired symbol stream (11) for all receivers $k \in \{1, \ldots, K\}$ and all rounds $r \in \{1, \ldots, R\}$. However, $Rn^N$ linear combinations are not sufficient to recover the $T = Rn^N + (n+1)^N$ data symbols transmitted in the first phase. Nevertheless, the compressed interference signal, transmitted at block k (18) $a_k$ (generated by transmitter k and available at all receivers in the second phase) is only interference for receivers $j \neq k$. For receiver k (9), the compressed interference signal, transmitted at block k (18) $a_k$ is a useful signal since it is a combination of the transmitter k (2) symbol stream (11). The compressed interference signal transmitted at block k, (18) $a_k$ adds $I = (n+1)^N$ additional combinations to the previous $Rn^N$. Therefore, the receiver k (9) recovers the signal $$[X^H, (W^H H_{kk}^1)^H, \ldots, (W^H H_{kk}^R)^H]^H s_k \quad (14)$$

at the end of phase 2. These additional linear combinations make the number of interference free linear combinations equal to the number of independent data streams sent in the first phase. Therefore, each receiver has enough information to recover every symbol transmitted by the associated transmitter.

Each transmitter transmits T independent symbols in $RT = R(Rn^N + (n+1)^N)$ time slots in the first phase. All data symbols are transmitted in the first phase. In the second phase, no new information is transmitted. The main motivation of the second phase is to remove the previously generated interference. This phase has a duration of $KI = K(n+1)^N$ time slots. Summing up all the contributions the proposed method can send $$\frac{K(Rn^N + (n+1)^N)}{R(Rn^N + (n+1)^N) + K(n+1)^N}, \quad (15)$$

symbols per time slot. For a large value of parameter n the proposed method can send, accordingly to equation (15)

$$\frac{K(R+1)}{R(R+1)+K} \quad (16)$$

symbols per time slot. If parameter R is set accordingly to $$R = [\sqrt{K}] - 1, \quad (17)$$

where [x] denotes the nearest integer to x, then the proposed method can send $$\frac{K}{[\sqrt{K}] - 1 + \frac{K}{[\sqrt{K}]}} \geq \frac{[\sqrt{K}]}{2}. \quad (18)$$

symbols per time slot. Therefore, the number of symbols transmitted per time slot increases with the square root of the number of transmitter/receiver pairs.

The parameter R may be set to any other value but for $R = [\sqrt{K}] - 1$ the present embodiment achieves the highest throughput. The distributed interference compression (23) may be performed differently, for example by performing the compression along the space domain and not along the time domain as in the present embodiment or by using other linear operator, in the distributed interference compression block (23), instead of matrix w as defined in equation (7) or a nonlinear operator instead of the linear operator or even by using any other type of redundant transmission instead of the repetition coding block (13). The present embodiment considers that each transmitter (transmitter 1 (1), . . . , transmitter k (2), . . . , and transmitter K (3)) and each receiver (receiver 1 (8), . . . , receiver k (9), . . . , and receiver K (10)) have a single antenna, but the present disclosure may be straightforwardly extended to the case where the transmitters and/or the receivers have several antennas. The symbol stream (11) may be coded or uncoded.

The term "comprising" whenever used in this document is intended to indicate the presence of stated features, integers, steps, components, but not to preclude the presence or addition of one or more other features, integers, steps, components or groups thereof.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

It is to be appreciated that certain embodiments of the disclosure as described herein may be incorporated as code (e.g., a software algorithm or program) residing in firmware and/or on computer useable medium having control logic for enabling execution on a computer system having a computer processor, such as any of the servers described herein. Such a computer system typically includes memory storage configured to provide output from execution of the code which configures a processor in accordance with the execution. The code can be arranged as firmware or software, and can be organized as a set of modules, including the various modules and algorithms described herein, such as discrete code modules, function calls, procedure calls or objects in an object-oriented programming environment. If implemented using modules, the code can comprise a single module or a plurality of modules that operate in cooperation with one another to configure the machine in which it is executed to perform the associated functions, as described herein.

The disclosure should not be seen in any way restricted to the embodiments described and a person with ordinary skill in the art will foresee many possibilities to modifications thereof.

The above described embodiments are combinable.

The following claims further set out particular embodiments of the disclosure.

The invention claimed is:

1. A transmitter device for a system of distributed interference cancelation based on delayed channel gain information for a plurality of transmitters and respective receivers, wherein the transmitter device comprises a processor and executable code which configures the processor to:
apply repetition coding to a symbol stream to be transmitted to obtain an encoded symbol stream;
apply a distributed interference compression to said symbol stream and to the delayed channel gain information, to obtain a compressed interference signal; and
transmit a signal of said encoded symbol stream and said compressed interference signal,
wherein said distributed interference compression is calculated such that the interference generated by each transmitter is the same, at the receivers, after distributed interference compression by each receiver.

2. The transmitter device according to claim 1, wherein the transmitter device is further configured to apply the distributed interference compression to said symbol stream and to the delayed channel gain information to obtain a compressed interference signal by applying the following operator:

$$X = \left[ \prod_{p,m,i \in S} \left( H_{mi}^{p(n_{mi}^p)} \right)^H w \right]^H_{\{0 \leq n_{mi}^p \leq n\}_{p,m,i \in S}} \quad (1)$$

where w may be any column vector, where $H_{kj}^r = \mathrm{diag}(h_{kj}((r-1)T+1), \ldots, h_{kj}((r-1)T+T))$ is the rth T symbol extension of the channel, $h_{kj}(t)$ represents the channel between transmitter j and receiver k at time t, K is the number of transmitter-receivers of said system, R is the number of groups of $T = Rn^N + (n+1)^N$ time slots, where n is chosen from the positive integer numbers, $N = RK(K-1)$, and $S = \{(r, k, j) | r \in \{1, \ldots R\}, k \neq j \in \{1, \ldots, K\}\}$.

3. A receiver device for a system of distributed interference cancelation based on delayed channel gain information for a plurality of transmitters and respective receivers, wherein the receiver device comprises a processor and executable code which configures the processor to:
receive an encoded symbol stream signal transmitted by a transmitter device, wherein repetition coding was applied by each transmitter to a symbol stream to obtain an encoded symbol stream;
receive compressed interference signals of said system transmitters, wherein distributed interference compression was applied by each transmitter to said symbol stream and to the delayed channel gain information, to obtain a compressed interference signal;
sum the received compressed interference signals of said system transmitters, except the received compressed interference signal from said transmitter device, to obtain an aggregate compressed interference signal;
apply a distributed interference compression to the received symbol stream signal and to channel gain information to obtain a received compressed signal; and
subtract from the received compressed signal the aggregate compressed interference signal to obtain an interference-free signal,
wherein said distributed interference compression is calculated such that the interference generated by each transmitter is the same, at the receivers, after distributed interference compression by each receiver.

4. The receiver device according to claim 3, wherein the receiver device is further configured to apply the distributed interference compression to the received symbol stream signal and to the channel gain information to obtain the received compressed signal by applying the following linear transformation:

$$W = \left[ \prod_{p,m,i \in S} \left( H_{mi}^{p(n_{mi}^p)} \right)^H w \right]_{\{0 \leq n_{mi}^p \leq n-1\}_{p,m,i \in S}} \quad (2)$$

where w may be any column vector, where $H_{kj}^r = \mathrm{diag}(h_{kj}((r-1)T+1), \ldots, h_{kj}((r-1)T+T))$ is the rth T symbol extension of the channel, $h_{kj}(t)$ represents the channel between transmitter j and receiver k at time t, K is the number of transmitter-receivers of said system, R is the number of groups of $T = Rn^N + (n+1)^N$ time slots, where n is chosen from the positive integer numbers, $N = RK(K-1)$, and $S = \{(r, k, j) | r \in \{1, \ldots R\}, k \neq j \in \{1, \ldots, K\}\}$.

5. The receiver device according to claim 4, wherein the receiver device is further configured to:
recover the transmitted symbol stream from the interference-free signal and from the received compressed interference signal from said transmitter device.

6. The receiver device according to claim 3, wherein the receiver device is further configured to:
recover the transmitted symbol stream from the interference-free signal and from the received compressed interference signal from said transmitter device.

7. A system of distributed interference cancelation based on delayed channel gain information for a plurality of transmitters and respective receivers, comprising a plurality of transmitters and a plurality of receivers,
each transmitter comprising a processor and executable code which configures the processor to:
apply repetition coding to a symbol stream to be transmitted to obtain an encoded symbol stream;
apply a distributed interference compression to said symbol stream and to the delayed channel gain information, to obtain a compressed interference signal; and
transmit a signal of said encoded symbol stream and said compressed interference signal,
wherein said distributed interference compression is calculated such that the interference generated by each transmitter is the same, at the receivers, after distributed interference compression by each receiver, and
each receiver comprising a processor and executable code which configures the processor to:
receive an encoded symbol stream signal transmitted by a transmitter device, wherein repetition coding was applied by each transmitter to a symbol stream to obtain an encoded symbol stream;
receive compressed interference signals of said system transmitters, wherein distributed interference compression was applied by each transmitter to said symbol stream and to the delayed channel gain information, to obtain a compressed interference signal;
sum the received compressed interference signals of said system transmitters, except the received compressed interference signal from said transmitter device, to obtain an aggregate compressed interference signal;
apply a distributed interference compression to the received symbol stream signal and to channel gain information to obtain a received compressed signal; and
subtract from the received compressed signal the aggregate compressed interference signal to obtain an interference-free signal,
wherein said distributed interference compression is calculated such that the interference generated by each transmitter is the same, at the receivers, after distributed interference compression by each receiver.

8. The transmitter device according to claim 7, wherein the transmitter device is further configured to apply the distributed interference compression to said symbol stream and to the delayed channel gain information to obtain a compressed interference signal by applying the following operator:

$$X = \left[\prod_{p,m,i \in S} \left(H_{mi}^{p(n_{mi}^p)}\right)^H w\right]^H_{\{0 \leq n_{mi}^p \leq n\}_{p,m,i \in S}} \quad (5)$$

where w may be any column vector, where $H_{kj}^r = \text{diag}(h_{kj}((r-1)T+1), \ldots, h_{kj}((r-1)T+T))$ is the rth T symbol extension of the channel, $h_{kj}(t)$ represents the channel between transmitter j and receiver k at time t, K is the number of transmitter-receivers of said system, R is the number of groups of $T = Rn^N + (n+1)^N$ time slots, where n is chosen from the positive integer numbers, $N = RK(K-1)$, and $S = \{(r, k, j) | r \in \{1, \ldots R\}, k \neq j \in \{1, \ldots, K\}\}$.

9. The receiver device according to claim 7, wherein the receiver device is further configured to apply the distributed interference compression to the received symbol stream signal and to the channel gain information to obtain the received compressed signal by applying the following linear transformation:

$$W = \left[\prod_{p,m,i \in S} \left(H_{mi}^{p(n_{mi}^p)}\right)^H w\right]_{\{0 \leq n_{mi}^p \leq n-1\}_{p,m,i \in S}} \quad (6)$$

where w may be any column vector, where $H_{kj}^r = \text{diag}(h_{kj}((r-1)T+1), \ldots, h_{kj}((r-1)T+T))$ is the rth T symbol extension of the channel, $h_{kj}(t)$ represents the channel between transmitter j and receiver k at time t, K is the number of transmitter-receivers of said system, R is the number of groups of $T = Rn^N + (n+1)^N$ time slots, where n is chosen from the positive integer numbers, $N = RK(K-1)$, and $S = \{(r, k, j) | r \in \{1, \ldots R\}, k \neq j \in \{1, \ldots, K\}\}$.

10. The receiver device according to claim 7, wherein the receiver device is further configured to:
recover the transmitted symbol stream from the interference-free signal and from the received compressed interference signal from said transmitter device.

11. A method of operating a transmitter device for a system of distributed interference cancelation based on delayed channel gain information for a plurality of transmitters and respective receivers each having a processor and executable code which configures the processor, wherein the method comprises:
using the processor, applying repetition coding to a symbol stream to be transmitted to obtain an encoded symbol stream;
using the processor, applying a distributed interference compression to said symbol stream and to the delayed channel gain information, to obtain a compressed interference signal; and
transmitting a signal of said encoded symbol stream and said compressed interference signal,
wherein said distributed interference compression is calculated such that the interference generated by each transmitter is the same, at the receivers, after distributed interference compression by each receiver.

12. The method according to claim 11, wherein the applying of the distributed interference compression to said symbol stream and to the delayed channel gain information to obtain a compressed interference signal, is by applying the following operator:

$$X = \left[ \prod_{p,m,i \in S} \left( H_{mi}^{p(n_{mi}^p)} \right)^H w \right]^H_{\{0 \le n_{mi}^p \le n\}_{p,m,i \in S}} \quad (3)$$

where w may be any column vector, where $H_{kj}^r = \text{diag}(h_{kj}((r-1)T+1), \ldots, h_{kj}((r-1)T+T))$ is the rth T symbol extension of the channel, $h_{kj}(t)$ represents the channel between transmitter j and receiver k at time t, K is the number of transmitter-receivers of said system, R is the number of groups of $T = Rn^N + (n+1)^N$ time slots, where n is chosen from the positive integer numbers, $N = RK(K-1)$, and $S = \{(r, k, j) | r \in \{1, \ldots R\}, k \ne j \in \{1, \ldots, K\}\}$.

13. A method to operate a receiver device for a system of distributed interference cancelation based on delayed channel gain information for a plurality of transmitters and respective receivers each having a processor and executable code which configures the processor, wherein the method comprises:

receiving an encoded symbol stream signal transmitted by a transmitter device, wherein repetition coding was applied by each transmitter to a symbol stream to obtain an encoded symbol stream;

receiving compressed interference signals of said system transmitters, wherein distributed interference compression was applied by each transmitter to said symbol stream and to the delayed channel gain information, to obtain a compressed interference signal;

using the processor, summing the received compressed interference signals of said system transmitters, except the received compressed interference signal from said transmitter device, to obtain an aggregate compressed interference signal;

using the processor, applying a distributed interference compression to the received symbol stream signal and to channel gain information, to obtain a received compressed signal; and using the processor, subtracting from the received compressed signal the aggregate compressed interference signal, to obtain an interference-free signal, wherein said distributed interference compression is calculated such that the interference generated by each transmitter is the same, at the receivers, after distributed interference compression by each receiver.

14. The method according to claim 13, wherein the applying of the distributed interference compression to the received symbol stream signal and to channel gain information, to obtain the received compressed signal, is by applying the following linear transformation:

$$W = \left[ \prod_{p,m,i \in S} \left( H_{mi}^{p(n_{mi}^p)} \right)^H w \right]_{\{0 \le n_{mi}^p \le n-1\}_{p,m,i \in S}} \quad (4)$$

where w may be any column vector, where $H_{kj}^r = \text{diag}(h_{kj}((r-1)T+1), \ldots, h_{kj}((r-1)T+T))$ is the rth T symbol extension of the channel, $h_{kj}(t)$ represents the channel between transmitter j and receiver k at time t, K is the number of transmitter-receivers of said system, R is the number of groups of $T = Rn^N + (n+1)^N$ time slots, where n is chosen from the positive integer numbers, $N = RK(K-1)$, and $S = \{(r, k, j) | r \in \{1, \ldots R\}, k \ne j \in \{1, \ldots, K\}\}$.

15. The method according to claim 14, further comprising:

recovering the transmitted symbol stream from the interference-free signal and from the received compressed interference signal from said transmitter device.

16. The method according to claim 13, further comprising:

recovering the transmitted symbol stream from the interference-free signal and from the received compressed interference signal from said transmitter device.

* * * * *